US012420285B2

(12) United States Patent
Müller et al.

(10) Patent No.: US 12,420,285 B2
(45) Date of Patent: Sep. 23, 2025

(54) CONFIGURABLE PLACEMENT INDICATION FOR SAMPLE TUBE RACK RECEPTACLES

(71) Applicant: Beckman Coulter, Inc., Brea, CA (US)

(72) Inventors: Martin Müller, Schliersee-Neuhaus (DE); Roland Bader, Munich (DE)

(73) Assignee: Beckman Coulter, Inc., Brea, CA (US)

( * ) Notice: Subject to any disclaimer, the term of this patent is extended or adjusted under 35 U.S.C. 154(b) by 1118 days.

(21) Appl. No.: 17/273,252

(22) PCT Filed: Feb. 1, 2019

(86) PCT No.: PCT/IB2019/050809
§ 371 (c)(1),
(2) Date: Mar. 3, 2021

(87) PCT Pub. No.: WO2019/150312
PCT Pub. Date: Aug. 8, 2019

(65) Prior Publication Data
US 2021/0322994 A1   Oct. 21, 2021

(30) Foreign Application Priority Data
Feb. 1, 2018  (EP) .................................. 18154670

(51) Int. Cl.
*B01L 9/00*   (2006.01)
*B01L 9/06*   (2006.01)
*G01N 35/00*  (2006.01)

(52) U.S. Cl.
CPC ................. *B01L 9/523* (2013.01); *B01L 9/06* (2013.01); *G01N 35/00732* (2013.01); *B01L 2200/025* (2013.01); *B01L 2300/021* (2013.01); *B01L 2300/0829* (2013.01); *G01N 2035/00772* (2013.01); *G01N 2035/00801* (2013.01); *G01N 2035/00831* (2013.01)

(58) Field of Classification Search
None
See application file for complete search history.

(56) References Cited

U.S. PATENT DOCUMENTS

2005/0174241 A1\*  8/2005  Olsen ................. G08B 13/2437
                                                235/492
2006/0210451 A1    9/2006  Anderson et al.
(Continued)

FOREIGN PATENT DOCUMENTS

CN   201115828   9/2008
CN   101479042   7/2009
(Continued)

OTHER PUBLICATIONS

"Chinese Application Serial No. 201980011232.8, Office Action mailed Sep. 1, 2021", with English translation, 23 pages.

*Primary Examiner* — Paul S Hyun
(74) *Attorney, Agent, or Firm* — FROST BROWN TODD LLP (57) ABSTRACT

Body fluid sample carrier for use in a body fluid analyser and body fluid analyser using a body fluid sample carrier, wherein the body fluid sample carrier has a plurality of rack receptacles and a plurality of marker receptacles for receiving corresponding markers in order to improve the association between racks positioned on the carrier and the correct position on the carrier.

18 Claims, 4 Drawing Sheets

(56) References Cited

U.S. PATENT DOCUMENTS

| | | |
|---|---|---|
| 2008/0169346 A1* | 7/2008 | Schad .................... G06Q 10/08 |
| | | 700/227 |
| 2009/0075385 A1 | 3/2009 | Fournier et al. |
| 2009/0136386 A1 | 5/2009 | Duffy et al. |
| 2009/0253195 A1 | 10/2009 | Potts et al. |
| 2010/0046068 A1 | 2/2010 | Tafas |
| 2011/0014095 A1 | 1/2011 | Ueda et al. |
| 2012/0220024 A1 | 8/2012 | Cobb |
| 2014/0110480 A1 | 4/2014 | Burri et al. |
| 2014/0113278 A1 | 4/2014 | Thomas et al. |
| 2014/0147922 A1 | 5/2014 | Knofe et al. |
| 2014/0240096 A1 | 8/2014 | Johns et al. |
| 2015/0170874 A1* | 6/2015 | Price .................... H01J 37/023 |
| | | 250/440.11 |

FOREIGN PATENT DOCUMENTS

| | | |
|---|---|---|
| CN | 202715417 | 2/2013 |
| CN | 104093488 | 10/2014 |
| CN | 206642771 | 11/2017 |
| CN | 206897458 | 1/2018 |

\* cited by examiner

CONFIGURABLE PLACEMENT INDICATION FOR SAMPLE TUBE RACK RECEPTACLES

CROSS-REFERENCE TO RELATED APPLICATION

This application is a U.S. National Stage Filing under 35 U.S.C. 371 from International Application No. PCT/IB2019/050809, filed on Feb. 1, 2019, and published as WO 2019/150312 on Aug. 8, 2019, which claims priority to EP application Ser. No. 18154670.6, filed Feb. 1, 2018, which applications are incorporated herein by reference in their entireties.

FIELD OF THE INVENTION

The present invention relates to a sample rack for a body fluid analyser, and in particular to a sample rack having an improved information indicator property.

BACKGROUND OF THE INVENTION

With body fluid analysers, customers or users need to place racks with body fluids to be analysed on the correct location on a so-called base frame on a drawer or carrier. The workplace meaning is defined with so-called regions on the base frames or carriers, which require the rack to be positioned at the exact position to be recognised by the software and associated with the workplace. When placing the racks on the drawer or carrier, the position needs to be correct, otherwise the analysed picks up the wrong sample and allocates the result to the wrong patient.

There may be a need to improve the perception by a user or customer or operator of how to place racks on a sample carrier in order to avoid failures when positioning racks on a sample carrier to be fed with a body fluid analyser. As an analyser may be operated with different combinations of racks on a sample carrier, there may be a need for a flexible solution to provide respective information on a sample carrier with respect to the racks to be positioned on the sample carrier.

SUBJECT MATTER OF THE INVENTION

The present invention provides a body fluid sample carrier and an analyser having an improved arrangement for providing a user with information on how to arrange racks on a sample carrier, and a corresponding method according to the independent claims, wherein further embodiments are incorporated in the dependent claims.

According to an embodiment of the invention, there is provided a body fluid sample carrier for use in a body fluid analyser, the body fluid sample carrier comprises a frame having a plurality of rack receptacles along a longitudinal extension of the body fluid sample carrier, an arrangement of one or more rack receptacles is adapted for receiving a rack having one or more cavities for carrying a container for body fluids, and a plurality of marker receptacles each being adapted for receiving a marker, wherein each of the plurality of marker receptacles is associated to a corresponding one or at least one of the plurality of rack receptacles and/or spaces between rack receptacles, wherein each of the plurality of marker receptacles is adapted to receive a marker being indicative for a rack with cavities for carrying a container for body fluids in the respective rack receptacles or a space between racks of body fluids in the respective rack receptacles.

Thus, it is possible for an operator or user to mark regions on the body fluid sample carrier physically on the frame, so that it is easier to identify the correct position for the racks to be positioned.

According to an embodiment of the invention, at least one, in particular each of the rack receptacles comprises a pair of protrusions or detentions for establishing a form fit connection with the received rack. Thus, a safe and position stable reception of the racks can be achieved. The pair of protrusions or detentions may be in particular arranged traverse to a longitudinal extension of the body fluid sample carrier, wherein the extension of the body fluid sample carrier corresponds to an extension of an arrangement of the plurality of marker receptacles.

According to an embodiment of the invention, the plurality of marker receptacles forms a first arrangement being arranged along a longitudinal extension of the body fluid sample carrier and on one side of the body fluid sample carrier, wherein the body fluid sample carrier comprises a second arrangement of a plurality of marker receptacles being arranged along a longitudinal extension of the body fluid sample carrier and on other side of the body fluid sample carrier, wherein one protrusion or detention of each pair is associated to marker receptacles on the one side of the body fluid carrier, and the other protrusion or detention of each pair is associated to marker receptacles on the other side of the body fluid carrier. Thus, half width size racks can be used, wherein two of the half width size racks can be arranged side by side, wherein each of the half width size racks is associated to either of the marker receptacles on either the one or the other side of the body fluid sample carrier.

According to an embodiment of the invention, the body fluid sample carrier further comprises at least one marker, wherein the marker is adapted to be received by one of the marker receptacles of the frame, wherein the marker carries an optical information.

Thus, it is possible for the operator or user to use a marker carrying an optical information being indicative for the position of a respective rack receptacle on a sample carrier, in particular on a frame of a sample carrier.

According to an embodiment of the invention, the optical information is a colour code.

Thus, it is possible for the operator or user to identify particular positions on the sample carrier, in particular rack receptacles, according to a colour code in order to place the correct rack on the respective rack receptacle. It should be noted, that a rack may occupy a single rack receptacle, but may also occupy two or more rack receptacles of the body fluid sample carrier. In particular, when providing a body fluid sample carrier for different rack sizes, the markers with the colour code may be used to identify the different locations on the body fluid sample carrier and locations of different sizes corresponding to the rack size.

According to an embodiment of the invention, the optical information comprises an arrow indicative of a mounting direction of the body fluid sample carrier for mounting the body fluid sample carrier in a body fluid analyzer. The arrow may be directed to and/or may point towards an end of the body fluid sample carrier. Accordingly, the arrow may point towards the body fluid sample analyzer or away from the body sample analyzer, when the body fluid sample carrier is mounted to the body fluid analyzer. This may simplify mounting the body fluid sample carrier to the body fluid analyzer by providing an optically perceptible information and/or guidance to the user or operator.

According to an embodiment of the invention, the optical information comprises an input attribute indicative of an input region of the body fluid sample carrier configured to carry at least one rack to be supplied to a body fluid analyzer for processing. For instance, the input attribute may be indicative of a region of the body fluid sample carrier that caries at least one rack containing one or more unprocessed containers and/or one or more containers that have not yet been processed. Accordingly, further information may be provided to the user or operator by the input attribute allowing the user or operator to quickly and reliably identify a region of the body fluid sample carrier, where a rack containing one or more unprocessed containers should preferably be placed and/or are placed. By way of example, the input attribute may comprise an icon attribute, an input icon attribute, a symbol, an input symbol, a text marking and/or a text attribute. A text attribute of the input attribute may e.g. comprise the text "IN" and/or "input".

According to an embodiment of the invention, the optical information comprises an output attribute indicative of an output region of the body fluid sample carrier configured to carry at least one rack that had been processed by a body fluid analyzer. For instance, the output attribute may be indicative of a region of the body fluid sample carrier that caries at least one rack containing one or more processed containers and/or one or more containers that have already been processed. Accordingly, further information may be provided to the user or operator by the output attribute allowing the user or operator to quickly and reliably identify a region of the body fluid sample carrier, where a rack containing one or more processed containers are preferably placed. By way of example, the output attribute may comprise an icon attribute, an output icon attribute, a symbol, an output symbol, a text marking and/or a text attribute. A text attribute of the output attribute may e.g. comprise the text "OUT" and/or "output".

According to an embodiment of the invention, the optical information comprises a blockage attribute indicative of a region of the body fluid sample carrier configured to carry at least one rack that should not and/or must not be removed from the body fluid sample carrier, e.g. by the user or operator. Accordingly, by means of the blockage output attribute further information can be provided to the user or operator. The blockage attribute and/or the further information conveyed thereby to the user or operator may ensure that the body fluid sample carrier is safely operated, e.g. by preventing the user from removing a rack from the region marked with a marker comprising the blockage attribute. The blockage attribute may, for example, comprise at least one of an icon attribute and a text attribute.

According to an embodiment of the invention, the optical information comprises at least one of an icon attribute and a text attribute. By means of an icon attribute and/or a text attribute, additional information can be provided and/or conveyed to the user or operator in an efficient, reliable, and fast manner. Further, the information provided to the user or operator by the icon attribute and/or the text attribute may be easily perceptible by the user. Accordingly, the icon attribute and/or the text attribute may further ensure safe operation of the body fluid sample carrier.

According to an embodiment of the invention, the marker is adapted to reveal the optical information from both, a side view of the body fluid sample carrier and a top view of the body fluid sample carrier.

Thus, it is easy for an operator to recognise the optical, in particular colour information of the marker regardless of the viewing position with respect to the body fluid sample carrier. In particular, when providing markers on a longitudinal side of a body fluid sample carrier, the operator may recognise the optical information of a marker from a side view and a top view. It should be noted, that a plurality of rack receptacles may be provided on both lateral sides of a body fluid sample carrier. The operator may provide corresponding markers on both sides of the carrier, if the rack extends to both lateral sides, so that the operator may recognise the optical information of the markers regardless of the viewing site. As an alternative, the operator may use different markers on the left and right side when using smaller racks being arranged side by side. Thus, the left marker receptacle row may be used for the left racks and the right marker receptacle row may be used for the right racks. Owing to the recognisability of the markers when viewed from top, even for the latter alternative the operator may recognize the entire marker set up.

According to an embodiment of the invention, each of the markers comprises a first plated section, which, when being received in the respective marker receptacle, extends in a top-down direction along a longitudinal extension of the body fluid sample carrier, and a second plated section, which, when being received in the respective marker receptacle, extends in a direction perpendicular to the first plated section along a longitudinal extension of the body fluid sample carrier.

Thus, it is possible to provide the optical information on both, the first plated section and the second plated section, wherein the plated sections are arranged so as to be recognised from different viewing directions, in particular viewing directions being perpendicular to each other. In particular, the second plated section may be recognized when viewed from top, so that even when placing different markers on the left and right side, the entire set up may be recognized at first sight.

According to an embodiment of the invention, the second plated section is adapted to serve as a finger grip.

Thus, it is possible for an operator or user to simply place a marker into a position of a marker receptacle and to remove the marker from the same. In particular, when using a clamping fixation or a pocket fixation, it is easy for a user or operator to remove the marker from the body fluid sample carrier, even if the user has slippery fingers.

According to an embodiment of the invention, the marker receptacles each comprise a bay arrangement for receiving a marker from a top-down mounting direction.

Thus, it is possible to put the markers into the bay arrangement from top to down, so that gravity keeps the markers in place, even if the markers are not clamped into the bay arrangement. Without clamping arrangement, the markers remain in place due to gravity, but may also be removed easily by putting the carrier without racks upside down.

According to an embodiment of the invention, the bay arrangement comprises two pockets, each pocket being oriented to be opened toward an upward direction and toward each other in a direction along the longitudinal extension of the body fluid sample carrier.

Thus, it is possible to reveal a large viewing area of the marker, as the pockets only cover small side or even corner parts of the marker. It should be noted, that the marker may also be in a clamping position in the pockets. The pockets may have rounded corners.

According to an embodiment of the invention, the marker receptacles each comprise a magnetic attachment area for receiving a marker in a magnetic adhesive manner.

Thus, it is possible to position a marker on a respective marker receptacle without the need of any protrusions or clamping arrangements, which may simplify the cleaning of the body fluid sample carrier. It should be noted that in this particular case when being used in combination with a magnetic marker, the frame of the sample carrier, and in particular the marker receptacles may be flat faces having for example only a mark on the surface where to place the respective marker on the flat surface. Avoiding pockets may also avoid hidden locations where dirt traps.

According to an embodiment of the invention, the magnetic attachment area comprises a magnet arrangement, wherein also the marker comprises the magnet arrangement, wherein the magnet arrangement on the magnetic attachment area and the magnet arrangement on the marker are matched to each other in a manner that the cooperation between the magnet arrangement on the magnetic attachment area and the magnet arrangement on the marker brings the marker into a predetermined position when being attached.

Thus, by selecting a particular magnetic arrangement on both the body fluid sample carrier site and the marker site, the positioning of the markers may be supported and guided by means of the respective magnet arrangements. By choosing a particular plurality of the magnets of the magnet arrangements, the marker may automatically find its correct position on the marker receptacle of the body fluid sample carrier without further detailed adjustment of the markers by a used or operator.

According to an embodiment of the invention, the marker receptacle further comprises an arrangement of protrusions and/or detentions, wherein the marker further comprises an arrangement of protrusions and/or detentions, wherein the arrangement of protrusions and/or detentions of the marker receptacle and the arrangement of protrusions and/or detentions of the marker match each other according to allowed combinations of a marker receptacle and a corresponding marker.

Thus, it is possible to provide with the protrusions and/or detentions arrangement a particular coding, so that only intended markers can be positioned on particular positions of the marker receptacles on the body fluid sample carrier. The protrusions and detentions may also serve to maintain a unique orientation of the marker and to avoid a wrong placement. Protrusions and detentions may fulfil the same object as the magnet arrangements on both sides, the marker side and the receptacle side. It should be noted that also a combination of protrusions/detentions and a magnet arrangement may be used.

According to an embodiment of the invention, the body fluid sample carrier further comprises a detecting unit being adapted to detect at least one of an information comprised in the marker and the position of the marker on the body fluid sample carrier.

Thus, it is possible to detect the marker information and the marker position on the carrier so as to provide this information to a processing unit. This information can be used to check and monitor the positions of the racks and in particular whether the racks are correctly positioned on the carrier at the predetermined positions.

According to an embodiment of the invention, the body fluid analyser comprises a track for a body fluid sample carrier according to one of the previously described embodiments to be used in connection with a body fluid analyser, a receiver for receiving an information comprised in marker or a position of a marker being detected by at least one of a detecting unit being provided at a body fluid sample carrier to be used in connection with the body fluid analyser and the detecting unit being provided at the body fluid analyser, a processor unit being adapted to control a graphical user interface to be connected to the body fluid analyser, wherein the processor unit is adapted to collect from the receiver at least one of an information comprised in a marker and the position of a marker on the body fluid sample carrier to be used in connection with the body fluid analyser, wherein the processor unit is adapted to control a graphical user interface to be connected to the body fluid analyser based on the information comprised in a marker and the position of a marker on the body fluid sample carrier to display a rack scheme in correspondence with the actual body fluid sample carrier being used in connection with the body fluid analyser.

Thus, it is possible to provide a body fluid analyser with a detection system, so that the body fluid analyser may detect the information on the markers being positioned on the carriers so as to check and monitor whether positions of racks on the carrier are correct with respect to the information laid down in the markers.

According to an embodiment of the invention, the body fluid analyser further comprises a detecting unit being adapted to detect at least one of an information comprised in a marker and a position of a marker on a body fluid sample carrier to be used in connection with a body fluid analyser, wherein the detecting unit provides the detected information with the receiver.

Thus, a detecting unit may not only be provided at the body fluid sample carrier site, but also on the body fluid analyser site. It should be noted, that a detection unit may also be provided on both the body fluid sample carrier, as well as the body fluid analyser, wherein, when using two detecting units on both sites, a plausibility check may be conducted in order to verify the information.

According to another aspect of the invention there is provided a method for marking a body fluid sample carrier for use in a body fluid analyzer, the method comprises arranging at least one rack having one or more cavities for carrying a container for body fluids to a respective number of one or more of a plurality of rack receptacles along a longitudinal extension of the body fluid sample carrier, each rack receptacle being adapted for receiving at least a part of a rack; arranging at least one marker on a respective one of a plurality of marker receptacles on a frame of a body fluid sample carrier, each of a plurality of marker receptacles being adapted for receiving a marker; wherein each of the plurality of marker receptacles is associated to a corresponding one or at least one of the plurality of rack receptacles, wherein the at least one of the plurality of markers on the marker receptacles is indicative for a rack of body fluids in the respective associated rack receptacles or a space between racks of body fluids in the respective rack receptacles.

Thus, it is possible to mark a body fluid sample carrier and to simplify the handling of racks. In particular, it can be supported that a rack is located at the correct rack position and that in case of a wrong placement the fault can immediately be recognized by a user or operator.

According to an embodiment of the invention the method further comprises moving the body fluid sample carrier along a track of a body fluid analyzer; detecting at least one of an information comprised in a marker and a position of a marker on the body fluid sample carrier to be used in connection with the body fluid analyzer, receiving the detected information and/or position with the receiver of a processor unit; processing the detected information and/or position for at least one of a check routine and a visualization of the racks on the body fluid sample carrier based on the information and/or position.

Thus, a body fluid sample carrier may be monitored when moving along a track of an analyzer. The detection of the markers allows to provide the information, which rack is located at which position on the carrier, so that the correct position can not only be monitored, e.g. for safety reasons, but also be visualized, e.g. on a graphical user interface.

According to an embodiment of the invention, the method further comprises controlling a graphical user interface to be connected to the body fluid analyzer based on the processed detected information on a marker and/or position of a marker to display a rack scheme in correspondence with the actual body fluid sample carrier being used in connection with the body fluid analyzer.

Thus, the actual marking on the body fluid sample carrier can be visualized on a graphical user interface, so that the user can recognize the carrier, even if the carrier is out of sight of the user or operator. Further, the user may monitor the correct positioning of the racks, in particular whether a particular rack is located at the correct rack receptacle.

According to an embodiment of the invention the detection takes place in a body fluid analyzer. According to another embodiment, the detection takes place on the body fluid sample carrier.

Thus, the detection may take place on either or both, the body fluid sample carrier and the analyzer. In case the detection takes place on the carrier, the detected information may be transferred to the analyzer, e.g. via a wireless connection. As an alternative the detection may take place on the analyzer. It is also possible to have both detections, so that the result thereof may be compared to identify a failure in detection.

It should be noted that the above noted embodiments and features may also be combined to achieve synergetic effects without departing from the invention.

BRIEF DESCRIPTION OF THE FIGURES

In the following it is referred to the following figures and drawings in order to explain the exemplary embodiments in detail. In the following.

DETAILED DESCRIPTION OF EXEMPLARY EMBODIMENTS

Figure 1:
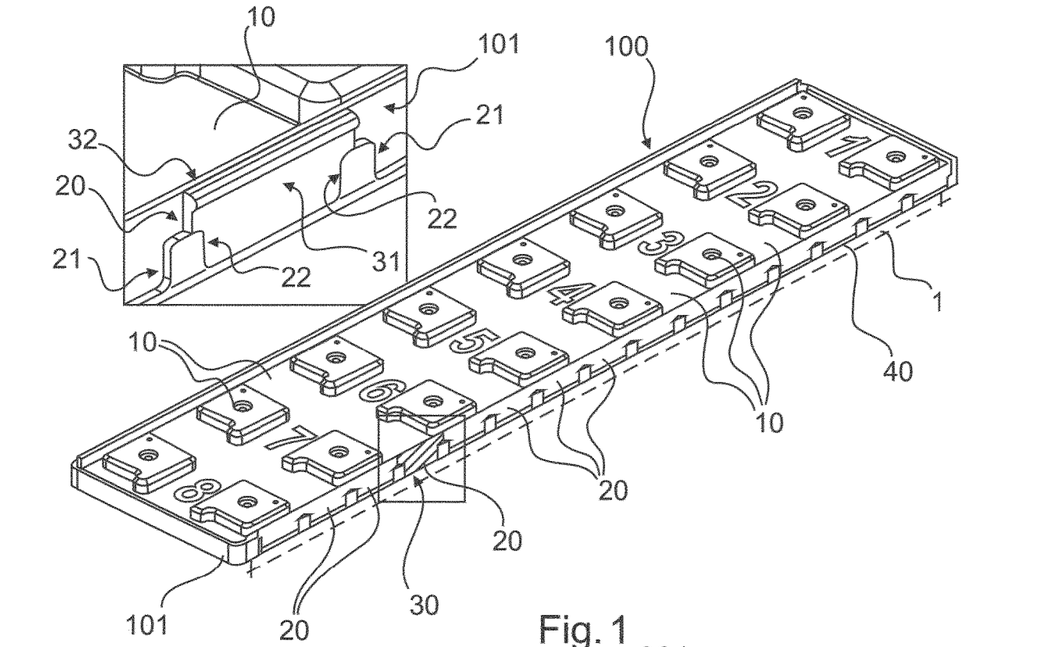
FIG. 1 illustrates a perspective view of a body fluid sample carrier as well as a detailed enlargement of a marker receptacle with marker according to an exemplary embodiment.

FIG. 1 illustrates a body fluid sample carrier 100. The body fluid sample carrier of FIG. 1 has integrated features, which act as receptacles for markers or chips, which may be for example coloured markers. The markers can be inserted into receptacles so as to visualise the correct expected positions on the rack. For this purpose, the body fluid sample carrier 100 has a frame 101, wherein the frame has rack receptacles 10 to receive racks. The body fluid sample carrier may have a plurality of rack receptacles 10 which may have a similar or corresponding shape, in order to have a modular positioning concept for the racks on the body fluid sample carrier as can be seen from following figures which will be described later. It should be noted that the receptacles may also have different shapes, if it is intended to allow only particular kinds of racks, which then may have a corresponding coupling geometry. The frame 101 has marker receptacles 20 for receiving markers 30. As can be seen from the enlarged view of FIG. 1, the marker receptacles 20 may have particular features 21, 22, for receiving the markers 30 and to keep the markers 30 in the correct position. The marker receptacles 30 may have the same size and shape so as to provide a modular system. It should be noted that the marker receptacles may also have different shapes, if it is intended to allow only particular kinds of markers, which then may have a corresponding coupling geometry. Although not illustrated in detail, a marker may also have a larger size to cover more than one receptacle. In particular, if adjacent receptacles are to be provided with the same marker type, a lager marker can be used to cover the corresponding plurality of receptacles. In case a rack is larger and covers more than one rack receptacles, also the size of the marker receptacle can be made larger, so that a marker receptacle is allocated to a plurality of rack receptacles. In this case a larger marker can be used for the larger marker receptacle so as to indicate a corresponding occupation of a plurality of rack receptacles.

The markers 30 may have a first plated section 31 and a second plated section 32. The first plated section faces a lateral side of the body fluid sample carrier so that the marker is perceivable from the side. The marker 30 may also have the second face 32, which is arranged in a perpendicular direction to the first face 31 in order to make the marker perceivable from a top view. Thus, it is possible for a user or operator to perceive the information of the marker from several views. It should be noted that the information provided by the marker may be an optical information, in particular a colour indication, so as to improve the association between racks and the correct position on the frame of the body fluid sample carrier.

As can be seen from the enlarged view of FIG. 1, the marker receptacle 20 may be provided with a pocket arrangement for receiving the marker from a top to down direction. The pockets being open toward the upward direction as well as toward each other provide a large viewing face of the marker without covering a large area of the first plated section 31. It should be noted that pockets of adjacent marker receptacles 20 may be provided by a single structure providing two adjacent pockets, one being allocated to one marker receptacle and the other being allocated to an adjacent marker receptacle.

Further, the body fluid sample carrier as shown in FIG. 1 comprises a detecting unit 40, which may detect the information contained in the marker with respect to the position of that particular marker when being in position. It should be noted that the unit 40 may detect the optical information laid down in the marker 30, but may also detect an information stored, for example in, an RFID being implemented in the marker 30. Thus, it is possible to detect the information of the marker and the respective position on the body fluid sample carrier so as to provide this information to a body fluid analyser.

Figure 2:
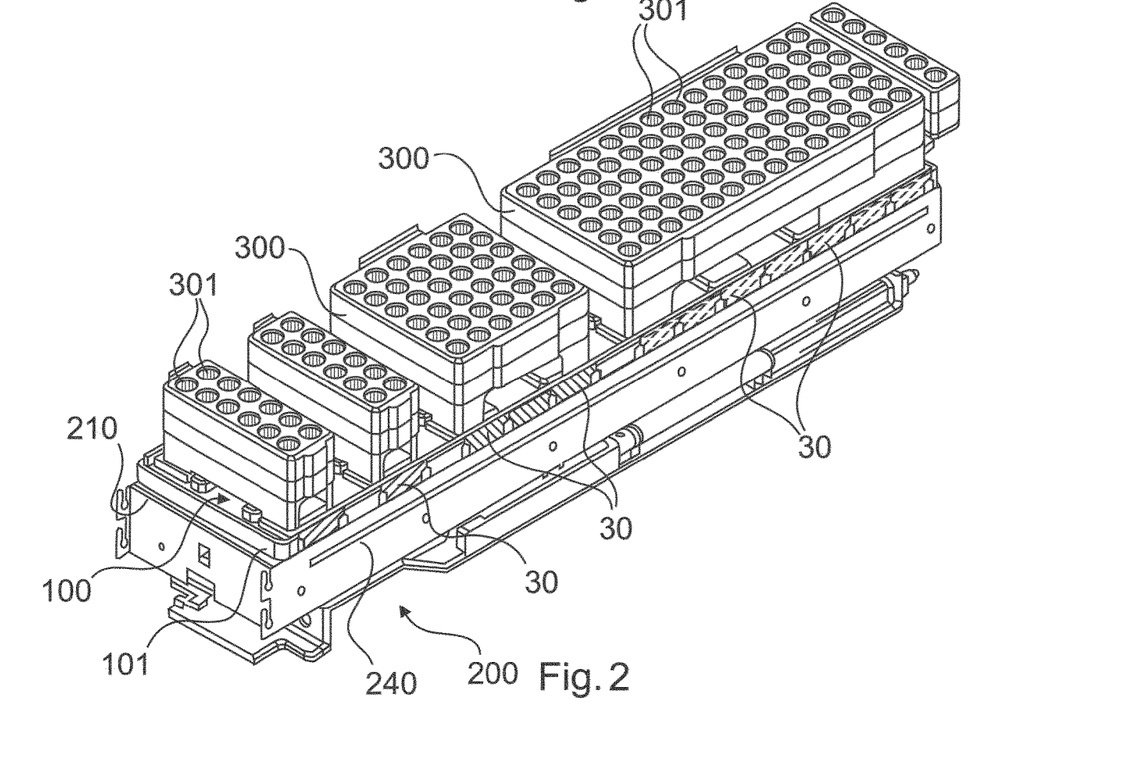
FIG. 2 illustrates a perspective view of a loaded body fluid sample carrier having racks of different sizes and being positioned on a drawer according to an exemplary embodiment.

FIG. 2 illustrates a body fluid sample carrier 100 on a drawer of a body fluid analyser 200. The body fluid sample carrier 100 may travel on a track 210 of the body fluid analyser 200. FIG. 2 further illustrates how several racks 300 may be positioned on the body fluid sample carrier 100. As can be seen from FIG. 2, racks 300 of different sizes may be positioned on the body fluid sample carrier 100. Each rack 300 may have one or a plurality of rack containers or rack cavities for carrying a container, each being adapted for receiving or holding body fluids.

As can be seen from FIG. 2, markers 30 are positioned at respective positions on the body fluid sample carrier on corresponding marker receptacles 20 and provide information to an operator or user where to place which rack 300 on the body fluid sample carrier 100. As can be seen from FIG. 2, the particular colour of a marker 30 may be used to indicate that a small rack should be positioned, wherein a different colour may be used to indicate that a larger rack of a particular size can be positioned at this marked position on the body fluid sample carrier 100.

Figure 3:
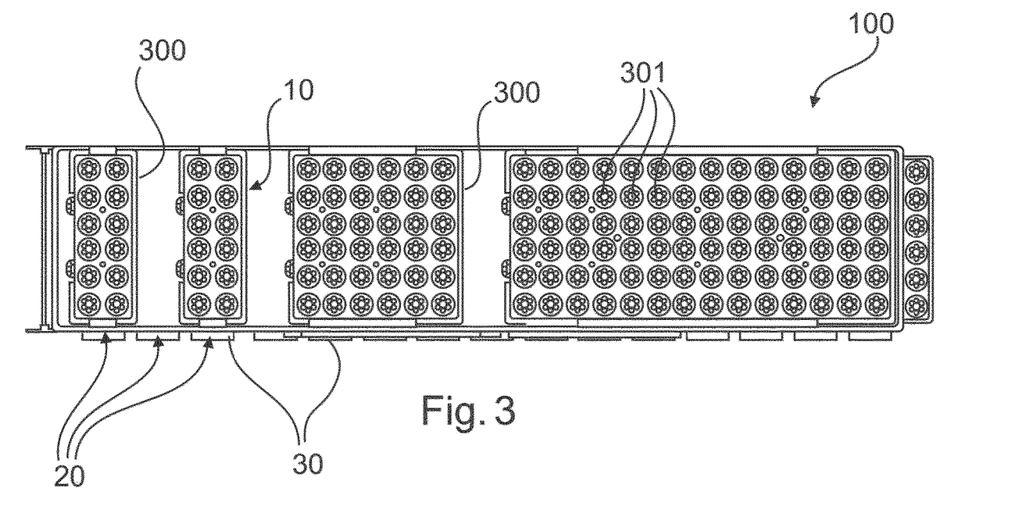
FIG. 3 illustrates a top view of a body fluid sample carrier having positioned different racks of different sizes thereon according to an exemplary embodiment.

FIG. 3 illustrates a top view of a body fluid sample carrier 100 with racks 300 positioned thereon in a top view. Racks 300 of different sizes are positioned on the body fluid sample carrier 100, wherein respective markers 30 are in respective positions to marker receptacles 20 to indicate where to position respective racks of a particular size.

Figure 4:
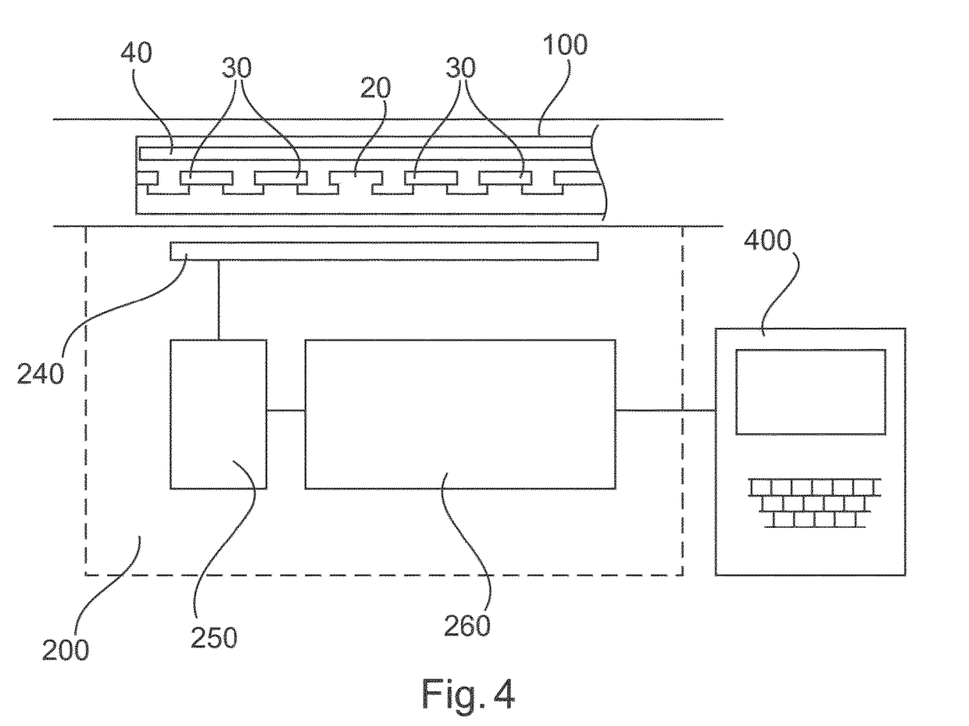
FIG. 4 illustrates a schematic view of a detection arrangement on the body fluid sample carrier site and/or a body fluid analyser site according to an exemplary embodiment.

FIG. 4 illustrates a schematic view of a detection arrangement on a body fluid sample carrier 100 and/or a body fluid analyser 200. FIG. 4 illustrates a body fluid sample carrier 100 on a track 210 of a body fluid analyser 200. The body fluid sample carrier 100 travels along the rack 210. According to one option, the body fluid sample carrier 100 is provided with a detecting unit 40 so as to detect a respective marker 30 and its information with respect to the particular position of a marker receptacle 20 which receives the marker 30. The information detected by the detecting unit 40 may be provided to a receiver 250 of the analyser 200 in order to provide this information to a processor unit 260. As an alternative, also the analyser 200 may be provided with a detecting unit 240 in order to detect the markers 30 with its information with respect to the respective position of the marker receptacle 20. This received information may be provided to the receiver 250 of the body fluid analyser 200. It should be noted that, according to one embodiment, a detecting unit may also be provided on both the body fluid sample carrier, as well as the analyser.

The information received from the detecting units 40, 240 may be evaluated in a processor unit 260 and may be provided to a graphical user interface 400, which may be connected to the analyser 200. Thus, the graphical user interface may illustrate for a user or operator the respective racks on a body fluid sample carrier by an automatic detection. Thus, a user or operator may directly recognise whether the body fluid sample carrier is correctly loaded with racks, wherein the graphical user interface 400 may also be used to output error warnings if the processor unit should detect that the actual positioning of the racks on the body fluid sample carrier is incorrect or not as intended.

Figure 5:
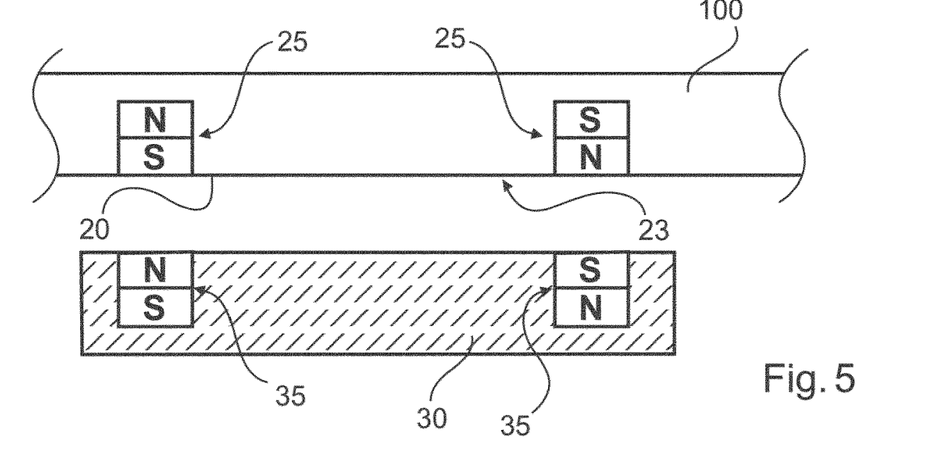
FIG. 5 illustrates a first magnetic arrangement combination of a marker receptacle and a respective marker according to an exemplary embodiment.

FIG. 5 illustrates an embodiment of a magnet arrangement on a marker receptacle 20 and a marker 30. The marker receptacle 20 may have a magnetic attachment area so as to receive a marker. It should be noted that, the magnetic attachment area may be a flat area where, for example, visual markings for a positioning (not shown) may be provided for supporting the positioning of the marker 30 onto a marker receptacle 20. When choosing a particular magnet arrangement 25 on the marker receptacle 20, as well as a magnet arrangement 35 on the marker 30, the positioning may be supporting by coding the orientation of the magnet poles of the magnet arrangements so as to match a north pole and a south pole of a magnet cooperating mutually. Thus, it can be achieved that a marker is arranged in a correct orientation. As can be seen in FIG. 5, if a user were to change the orientation of the marker 30 by changing left and right orientation, the magnets on the marker side and the magnets of the marker receptacle side would have the same polarity and therefore would avoid attachment of the marker in a wrong position/orientation.

Figure 6:
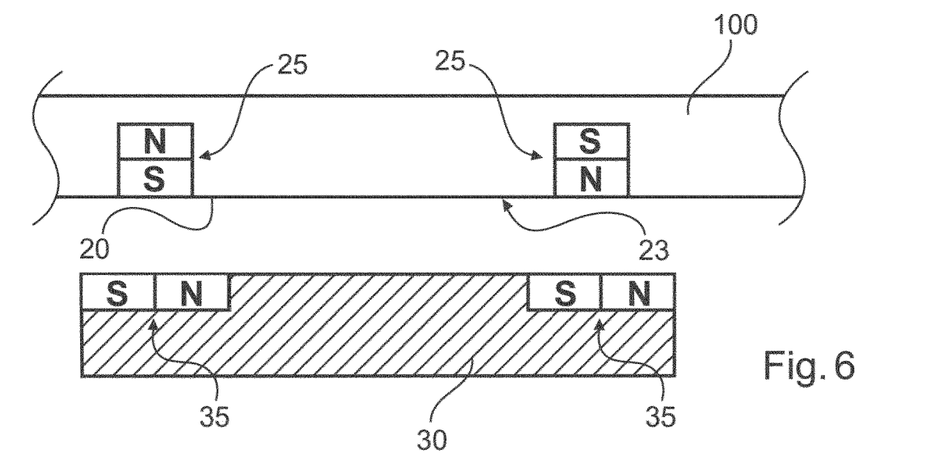
FIG. 6 illustrates another magnetic arrangement of a marker receptacle and a corresponding marker according to an exemplary embodiment.

FIG. 6 illustrates a further embodiment of a marker 30 and marker receptacle 20, each having a respective magnet arrangement 25, 35, a magnet arrangement 25 on the marker receptacle 20 side and a magnet arrangement 35 on the marker 30 side. Providing respective polarities of the magnets of each of the magnet arrangements will ensure a correct positioning of the marker without any further guiding structures, as the marker according to FIG. 6 will automatically flip into the correct position on the marker receptacle 20 owing to the polarity and magnet arrangement orientation on the receptacle side and the marker side.

Figure 7:
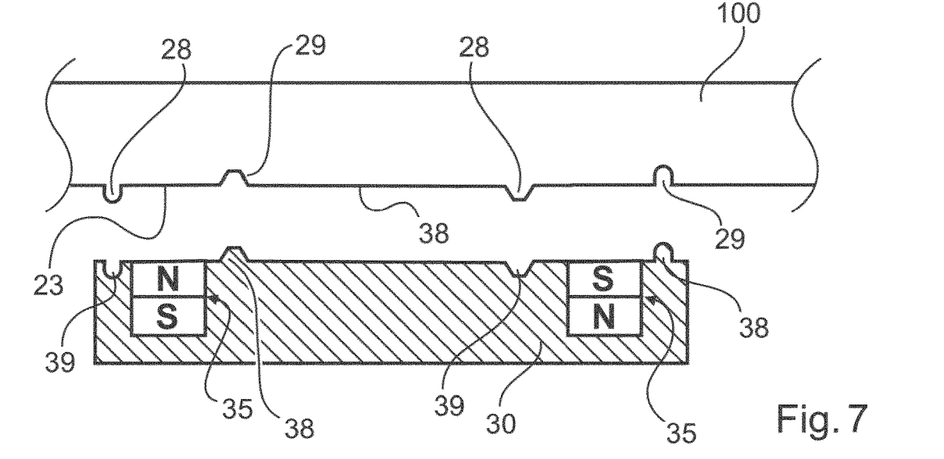
FIG. 7 illustrates another magnet arrangement of a marker receptacle and a marker in combination with a protrusion and/or detention arrangement on the marker receptacle and the marker site.

FIG. 7 illustrates a further embodiment, wherein the magnet arrangement 25 of the marker receptacle 20 does not have explicit magnets, but rather is formed from a magnetic material, for example a metal, an alloy, a composite structure or a matrix structure comprising iron, nickel or cobalt.

Thus, it is sufficient to provide a magnet only on one side, here the marker side 30. However, it should be noted that the magnets may also be provided on the receptacle side and to manufacture the marker from a material adhering to the magnet, for example a material containing iron, nickel or cobalt. In order to support a positioning, the marker receptacle 20 may be provided with a protrusion and/or a detention arrangement 28, 29, wherein the marker 30 has a corresponding protrusion and/or detention arrangement 38, 39, in order to match with the marker receptacle 20. It should be noted, that the protrusions and/or detentions may have several shapes, for example a spherical shape as illustrated at the outer positions of the marker 30, but also may have a frustro-conical or trapezoid shape as illustrated on the inner positions. It should be noted that the shape of the protrusions/detentions are not limited to the illustrated shapes. It should also be noted, that the receptacle site may be provided with only protrusions or only detentions, wherein the markers may also be provided with corresponding ones of only protrusions or detentions.

Figure 8:
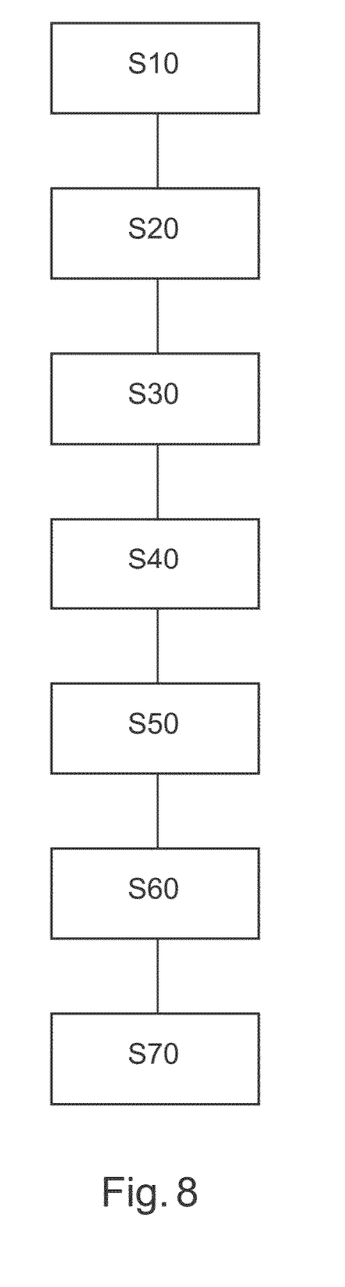
FIG. 8 illustrates a flow chart of a method according to an exemplary embodiment of the invention.

FIG. 8 illustrates a schematic flow chart of a method for marking a body fluid sample carrier for use in a body fluid analyzer. The method may have the following steps. It should be noted that not all steps are mandatory, and that some steps may be left out. Further, some steps may take place in a changed order or even parallel.

The steps are step S10 of arranging at least one rack 300 having one or more cavities for carrying a container 301 for body fluids to a respective number of one or more of a plurality of rack receptacles 10 along a longitudinal extension of the body fluid sample carrier 100. Each rack receptacle 10 may be adapted for receiving at least a part of a rack 300. A further step is step S20 of arranging at least one marker 30 on a respective one of a plurality of marker receptacles 20 on a frame 101 of a body fluid sample carrier 100, each of a plurality of marker receptacles 20 being adapted for receiving a marker. Each of the plurality of marker receptacles 20 is associated to a corresponding one of the plurality of rack receptacles 10 or a space there between. The at least one of the plurality of markers 30 on the marker receptacles 20 is indicative for a rack of body fluids in the respective associated rack receptacles 10 or a space between racks of body fluids in the respective rack receptacles 10.

The method may further comprise the step S30 of moving the body fluid sample carrier along a track of a body fluid analyzer 200, and the step S40 of detecting at least one of an information comprised in a marker 30 and a position of a marker on a body fluid sample carrier 100 to be used in connection with the body fluid analyzer 200. Further the method may comprise the step S50 of receiving the detected information and/or position with the receiver 250 of a processor unit 260, and the step S60 of processing the detected information and/or position for at least one of a check routine and a visualization of the racks on the body fluid sample carrier.

The method may further comprise the step S70 of controlling a graphical user interface to be connected to the body fluid analyzer 200 based on the processed detected information and/or position to display a rack scheme in correspondence with the actual body fluid sample carrier being used in connection with the body fluid analyzer. The step S40 of detection may take place in a body fluid analyzer 200, but may also take place on the carrier, or may take place on both, the analyzer and the carrier.

REFERENCES USED 10 rack receptacles
20 marker receptacles
21 bay arrangement, first pocket
22 bay arrangement, second pocket
23 magnetic attachment area on body fluid sample carrier
25 magnet arrangement
28 positioning protrusion on carrier body
29 positioning detention on carrier body
31 first plated section
32 second plated section
35 magnet arrangement on marker
38 positioning protrusion on marker
39 positioning detention on marker
40 detecting unit on body fluid sample carrier
100 body fluid sample carrier
101 frame of body fluid sample carrier
200 body fluid analyzer
210 track of body fluid analyzer
240 detecting unit on body fluid analyzer
250 receiver on body fluid analyzer for receiving detection information
260 processor unit on body fluid analyzer
300 rack
301 rack container/rack cavity for carrying a container
400 graphical user interface S10 arranging a rack a rack receptacle of a body fluid sample carrier
S20 arranging a marker on a marker receptacle of a body fluid sample carrier
S30 moving a body fluid sample carrier along a track of a body fluid analyzer
S40 detecting an information/position of a marker on a body fluid sample carrier
S50 receiving detected information/position
S60 processing detected information/position for check routine/visualization
S70 controlling a graphical user interface

The invention claimed is:

1. A body fluid sample carrier for use in a body fluid analyzer, the body fluid sample carrier comprising a frame comprising:
a plurality of rack receptacles along a longitudinal extension of the body fluid sample carrier, wherein an arrangement of one or more of the plurality of rack receptacles is adapted for receiving a plurality of racks each having one or more cavities for carrying a container for body fluids;
at least one marker that carries optical information, wherein the at least one marker is located on a longitudinal side of the body fluid sample carrier and the at least one marker is adapted to reveal the optical information from both a side view of the body fluid sample carrier and a top view of the body fluid sample carrier; and
a plurality of marker receptacles each being adapted for receiving one of the at least one marker;
wherein each of the plurality of marker receptacles is associated to at least one of the plurality of rack receptacles;
wherein the one of the at least one marker received by each of the plurality of marker receptacles is indicative for one of the racks in the at least one of the plurality of rack receptacles associated to the marker receptacle adapted to receive the one of the at least one marker or is indicative for a space between two of the racks in the at least one of the plurality of rack receptacles associated to the marker receptacle adapted to receive the one of the at least one marker; and
wherein each of the at least one marker comprises a first plated section, which, when being received in the respective marker receptacle, extends in a top-down direction which is perpendicular to the longitudinal extension of the body fluid sample carrier, and a second plated section, which, when being received in the respective marker receptacle, extends in a direction perpendicular to both the top-down direction and the longitudinal extension of the body fluid sample carrier, and wherein a thickness of the second plated section as measured in the direction perpendicular to both the top-down direction and the longitudinal extension of the body fluid sample carrier is greater than a thickness of the first plated section as measured in the direction perpendicular to both the top-down direction and the longitudinal extension of the body fluid sample carrier.

2. The body fluid sample carrier according to claim 1, wherein the optical information is a color code.

3. The body fluid sample carrier according to claim 1, wherein the optical information comprises an arrow indicative of a mounting direction of the body fluid sample carrier for mounting the body fluid sample carrier in a body fluid analyzer.

4. The body fluid sample carrier according to claim 1, wherein the optical information comprises an input attribute indicative of an input region of the body fluid sample carrier configured to carry at least one rack to be supplied to a body fluid analyzer for processing.

5. The body fluid sample carrier according to claim 1, wherein the optical information comprises an output attribute indicative of an output region of the body fluid sample carrier configured to carry at least one rack that had been processed by a body fluid analyzer.

6. Body fluid sample carrier according to claim 1, wherein the optical information comprises a blockage attribute indicative of a region of the body fluid sample carrier configured to carry at least one rack that should not be removed.

7. The body fluid sample carrier according to claim 1, wherein the optical information comprises at least one of an icon attribute and a text attribute.

8. The body fluid sample carrier according to claim 1, wherein the second plated section is adapted to serve as a finger grip.

9. The body fluid sample carrier according to claim 8, wherein the marker receptacles each comprise a bay arrangement for receiving a marker from a top-down mounting direction.

10. The body fluid sample carrier according to claim 9, wherein the bay arrangement comprises two pockets, each pocket being oriented to be open toward an upward direction and toward each other in a direction along the longitudinal extension of the body fluid sample carrier.

11. The body fluid sample carrier according to claim 1, wherein the marker receptacles each comprise a magnetic attachment area for receiving a marker in a magnetic adhesive manner.

12. The body fluid sample carrier according to claim 11, wherein the magnetic attachment area comprises a magnet arrangement, wherein the at least one marker comprises a magnet arrangement, wherein the magnet arrangement on the magnetic attachment area and the magnet arrangement on the at least one marker are matched to each other in a manner that the cooperation between the magnet arrangement on the magnetic attachment area and the magnet arrangement on the at least one marker brings the at least one marker in a predetermined position when being attached.

13. The body fluid sample carrier according to claim 1, wherein at least one of the plurality of marker receptacles further comprises an arrangement of protrusions and/or detentions, wherein the at least one marker received by the at least one of the plurality of marker receptacles further comprising the arrangement of protrusions and/or detentions further comprises an arrangement of protrusions and/or detentions, wherein the arrangement of protrusions and/or detentions of the at least one of the plurality of marker receptacles and the arrangement of protrusions and/or detentions of the at least one marker received by the at least one of the plurality of marker receptacles match with each other to allow combinations therebetween.

14. The body fluid sample carrier according to claim 1, further comprising a detecting unit being adapted to detect at least one of an information comprised in the at least one marker and a position of the at least one marker on the body fluid sample carrier.

15. A body fluid sample carrier for use in a body fluid analyzer, the body fluid sample carrier comprising a frame comprising:
a plurality of rack receptacles along a longitudinal extension of the body fluid sample carrier, wherein an arrangement of one or more of the plurality of rack receptacles is adapted for receiving a plurality of racks each having one or more cavities for carrying a container for body fluids;
at least one marker that carries optical information, wherein the at least one marker is located on a longitudinal side of the body fluid sample carrier and the at least one marker is adapted to reveal the optical information from both a side view of the body fluid sample carrier and a top view of the body fluid sample carrier; and
a plurality of marker receptacles each being adapted for receiving one of the at least one marker;
wherein each of the plurality of marker receptacles is associated to at least one of the plurality of rack receptacles;
wherein the one of the at least one marker received by each of the plurality of marker receptacles is indicative for one of the racks in the at least one of the plurality of rack receptacles associated to the marker receptacle adapted to receive the one of the at least one marker or is indicative for a space between two of the racks in the at least one of the plurality of rack receptacles associated to the marker receptacle adapted to receive the one of the at least one marker; and
wherein each of the at least one marker comprises a first plated section, which, when being received in the respective marker receptacle, extends in a top-down direction perpendicular to the longitudinal extension of the body fluid sample carrier, and a second plated section, which, when being received in the respective marker receptacle, extends in a direction perpendicular to both the top-down direction and the longitudinal extension of the body fluid sample carrier, wherein the side view of the body fluid sample carrier is along an axis perpendicular to both the top-down direction and the longitudinal extension of the body fluid sample carrier, and wherein the top view of the body fluid sample carrier is along an axis that extends in the top-down direction.

16. A device comprising:
a body fluid sample carrier having a length and a width, and comprising:
a rack receptacle adapted for receiving a body fluid sample rack comprising cavities for carrying containers for body fluids;
a marker receptacle disposed on an outside edge of the body fluid sample carrier along the length of the body fluid sample carrier and adjacent to the rack receptacle;
a marker which is adapted for being received by a marker receptacle, wherein:
the marker comprises a first section and a second section, each of which has:
a length which, when the marker is being received by the marker receptacle, extends along the length of the body fluid sample carrier;
a height which, when the marker is being received by the marker receptacle, extends perpendicular to the length of the body fluid sample carrier in an up and down manner; and
a width which, when the marker is being received by the marker receptacle, extends perpendicular both to the length of the body fluid sample carrier and to the height of the first section of the marker; and
the width of the second section is greater than the width of the first section.

17. The device of claim 16, wherein, when the marker is being received by the marker receptacle, the second section is disposed at a higher portion of the marker relative to the first section.

18. The device of claim 16, wherein:
- the body fluid sample carrier comprises a plurality of rack receptacles adapted for receiving body fluid sample racks and disposed along the length of the body fluid sample carrier;
- the body fluid sample carrier comprises a plurality of marker receptacles disposed adjacent to the plurality of rack receptacles along the length of the body fluid sample carrier on the outside edge of the body fluid sample carrier; and
- the marker is comprised by a plurality of markers adapted for being received by the plurality of marker receptacles, wherein, for each marker from the plurality of markers:
  that marker comprises a first section and a second section, each of which has:
  - a length which, when that marker is being received by one of the marker receptacles, extends along the length of the body fluid sample carrier;
  - a height which, when that marker is being received by one of the marker receptacles, extends perpendicular to the length of the body fluid sample carrier in an up and down manner;
  - a width which, when that marker is being received by one of the marker receptacles, extends perpendicular both to the length of the body fluid sample carrier and to the height of the first section of that marker;
  the width of the second section of that marker is greater than the width of the first section of that marker.

\* \* \* \* \*